(12) United States Patent
Bock (10) Patent No.: US 12,134,210 B2
(45) Date of Patent: Nov. 5, 2024

(54) METHOD AND DEVICE FOR THE FAST AND EFFICIENT HEATING OF PLASTIC GRANULATES FOR PREPARING FOR THE PROCESSING IN A PLASTICIZATION

(71) Applicant: Stefan Bock, Glarus (CH)

(72) Inventor: Stefan Bock, Glarus (CH)

( * ) Notice: Subject to any disclaimer, the term of this patent is extended or adjusted under 35 U.S.C. 154(b) by 809 days.

(21) Appl. No.: 17/287,018

(22) PCT Filed: Oct. 21, 2019

(86) PCT No.: PCT/DE2019/000283
§ 371 (c)(1),
(2) Date: Apr. 20, 2021

(87) PCT Pub. No.: WO2020/083421
PCT Pub. Date: Apr. 30, 2020

(65) Prior Publication Data
US 2021/0387380 A1 Dec. 16, 2021

(30) Foreign Application Priority Data

Oct. 24, 2018 (DE) ...................... 10 2018 008 445.1
Feb. 13, 2019 (DE) ...................... 10 2019 103 603.8

(51) Int. Cl.
| | |
|---|---|
| *F26B 23/02* | (2006.01) |
| *B29B 13/02* | (2006.01) |
| *B29B 13/06* | (2006.01) |
| *B29C 48/285* | (2019.01) |
| *B29C 48/793* | (2019.01) |

(Continued)

(52) U.S. Cl.
CPC ............ *B29B 13/065* (2013.01); *B29B 13/02* (2013.01); *B29C 48/287* (2019.02); *B29C 48/288* (2019.02); *B29C 48/793* (2019.02); *F26B 3/06* (2013.01); *F26B 17/124* (2013.01); *F26B 2200/08* (2013.01)

(58) Field of Classification Search
CPC ........ F26B 23/02; F26B 17/04; F26B 25/001; F26B 2200/02; F23G 7/05
USPC ......................................... 34/485, 566, 226
See application file for complete search history.

(56) References Cited

U.S. PATENT DOCUMENTS

| | | |
|---|---|---|
| 271,604 A | 2/1883 | Hook |
| 1,538,192 A | 5/1925 | Vernon |

(Continued)

FOREIGN PATENT DOCUMENTS

| | | | |
|---|---|---|---|
| DE | 19840358 A1 | 3/2000 | |
| DE | 102010024917 A1 * | 12/2011 | ........... B29B 13/065 |
| EP | 0719996 A1 | 7/1996 | |

*Primary Examiner* — John P McCormack
(74) *Attorney, Agent, or Firm* — LUCAS & MERCANTI, LLP; Klaus P. Stoffel (57) ABSTRACT

A method and an apparatus for rapid and efficient heating of polymer pellets in preparation for processing in a plastifier. For introduction of heat energy, a gas, preferably dried air, is introduced into the polymer pellets flow so as not to be in direct countercurrent thereto. The gas is preferably introduced in its still hottest state in a targeted fashion, for the purpose of rapid energy input, at a freely selectable location. This preferably takes place at the material output of the booster hopper. The gas is preferably conducted by way of cascades, which can be of a variable design, and flows through the bulk material at least twice. The speed of the flow can be influenced.

21 Claims, 6 Drawing Sheets

(51) Int. Cl.
 *F26B 3/06* (2006.01)
 *F26B 17/12* (2006.01)

(56) References Cited

U.S. PATENT DOCUMENTS

| | | | |
|---|---|---|---|
| 2,060,581 A | | 11/1936 | Laessig |
| 2,469,424 A | | 5/1949 | Wood |
| 2,766,534 A | | 10/1956 | Schaub |
| 4,045,882 A | | 9/1977 | Buffington |
| 5,885,537 A | * | 3/1999 | De Muynck ........... B01D 53/08 |
| | | | 422/177 |
| 6,405,454 B1 | * | 6/2002 | Kramer .................... B29B 9/16 |
| | | | 34/586 |

* cited by examiner

METHOD AND DEVICE FOR THE FAST AND EFFICIENT HEATING OF PLASTIC GRANULATES FOR PREPARING FOR THE PROCESSING IN A PLASTICIZATION

CROSS-REFERENCE TO RELATED APPLICATIONS

The present application is a 371 of International application PCT/DE2019/000283, filed Oct. 21, 2019, which claims priority of DE 10 2018 008 445.1, filed Oct. 24, 2018 and DE 10 2019 103 603.8, filed Feb. 13, 2019, the priority of these applications is hereby claimed and these applications are incorporated herein by reference.

BACKGROUND OF THE INVENTION

The invention relates to a method for heating and drying bulk materials, generally polymer pellets, which are prepared for the following plastifying process.

The invention furthermore relates to an apparatus for heating and drying bulk materials, generally polymer pellets, which are prepared for the following plastifying process.

Specifically, an application for bulk materials which are hygroscopic, and therefore need to be dried, is implemented in order to avoid degradation of the material during the plastifying process. In this case, the material is also supplied with heat energy, which significantly assists the plastifying process: the plastifying process becomes more stable since less energy for melting has to be supplied by the plastifying means to the polymer material.

The drying operation for polymer pellets is already very well-developed according to the prior art. In a drying hopper, in which the material for the plastifying operation is provided, sufficiently dry air is fed in in countercurrent, said air absorbing the excess moisture in a controlled manner.

The situation is different in the prior art for the simultaneous input of heat energy, since there is not always sufficient consideration given to this operation. The reason for this is that the measurement of the energy input is quite demanding. Although this factor does not disrupt the production process to the extent that would be the case in the event of excessive moisture, the energy consumption is significantly influenced.

In addition to the drying hopper, which is also known as single-stage drying, there is also already two-stage drying, which is often employed with preference for space reasons: in the case of single-stage drying, the drying hopper is situated directly above the plastifying means of an injection-molding machine or of an extruder. As a result, it is often the case that the structure is so tall that it does not fit in all factory halls. This can be dealt with by placing the drying hopper next to the machine and then conveying the material into a smaller hopper, also called a booster, directly above the machine.

Figure 1A:
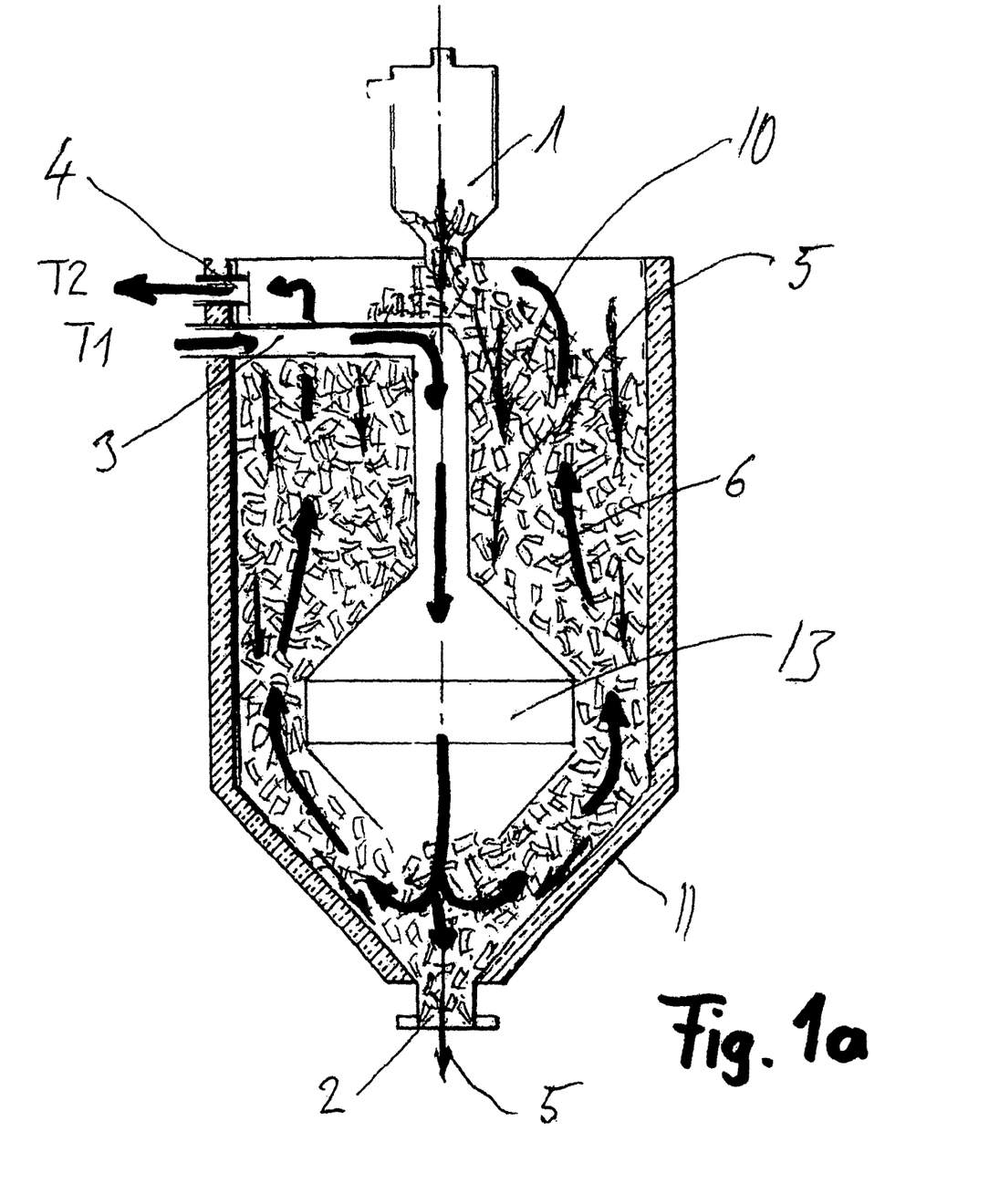
FIG. 1a shows a booster hopper according to the prior art.

An already known construction of a drying/booster hopper is illustrated in FIG. 1a. The difference between a drying hopper and a booster is in particular that, in the drying hopper, the bulk material is actively dried to a residual moisture of about 20-50 ppm, and heated to a temperature for example of about 180° C., as a result of the throughput of warm, dry air. To this end, however, it is necessary for the air to be cooled to about 50-60° C. again after each pass through the bulk material, in order to itself be dried again by means of desiccants in order to then be heated again.

A lot of energy is wasted as a result of the cooling down of the air. It thus makes sense to carry out the drying operation at a lower temperature level, such as for example 120° C., in order to be able to dispense with the subsequent cooling of the process air. This would not be a problem for the drying operation, but it would then be the case that too little heat energy for the subsequent melting process is supplied to the bulk material. Another advantage of this procedure is that, with this lower temperature in the comparatively large drying hopper, the material is subjected to significantly less damage in the case of very long residence times of 5-8 hours. During the processing of recycled materials, it is also the case that condensates, which contaminate the drier and have to be removed, are produced at higher temperatures. Recycled materials therefore generally tend to be dried at lower temperatures, such as for example 160° C.

The task of a further input of heat energy can then be undertaken by a further heating device, the booster. However, modern boosters are almost exclusively used to conserve, or marginally increase, the input heat energy from the drying process. These conventional boosters which are currently commercially available have their limits. In principle, a booster should receive only relatively small quantities of material, sufficient for example for a production time of 20-40 min, since many plastics, including polyethylene terephthalate (PET), degrade at high temperatures. In these 20-40 min, the polymer pellets should absorb further energy similarly to in the case of the drier with a countercurrent of heated air flow.

Whereas in the case of the drier, as mentioned, the process return air is cooled down in order to ensure satisfactory drying of the air in the drying cartridges by means of desiccants and in order to also protect the blower, the booster can, by contrast, cope with a significantly higher temperature level. The process air is sent in a continuous circuit in the booster through the polymer pellets, without the latter needing to be cooled for drying purposes. This means that the air density is correspondingly lower, and a significantly greater air volume is required for the transport of the heat energy.

Since the process air, and thus the heat energy, according to prior art FIG. 1a, is introduced against the flow of the bulk material, the heat input process rapidly reaches its limits with large quantities of air, since the polymer pellets start to float in the air and thus can no longer flow off to the plastifying means, and a continuous and sufficient supply of material is no longer ensured. However, since the flow rate of this process air is a function of the energy input rate into the pellets, the boosters currently have to be of such large construction to compensate for the lacking energy input rate with a corresponding residence time in the booster hopper. However, the increased residence time means there is again a direct risk of the material degrading.

Figure 1B:
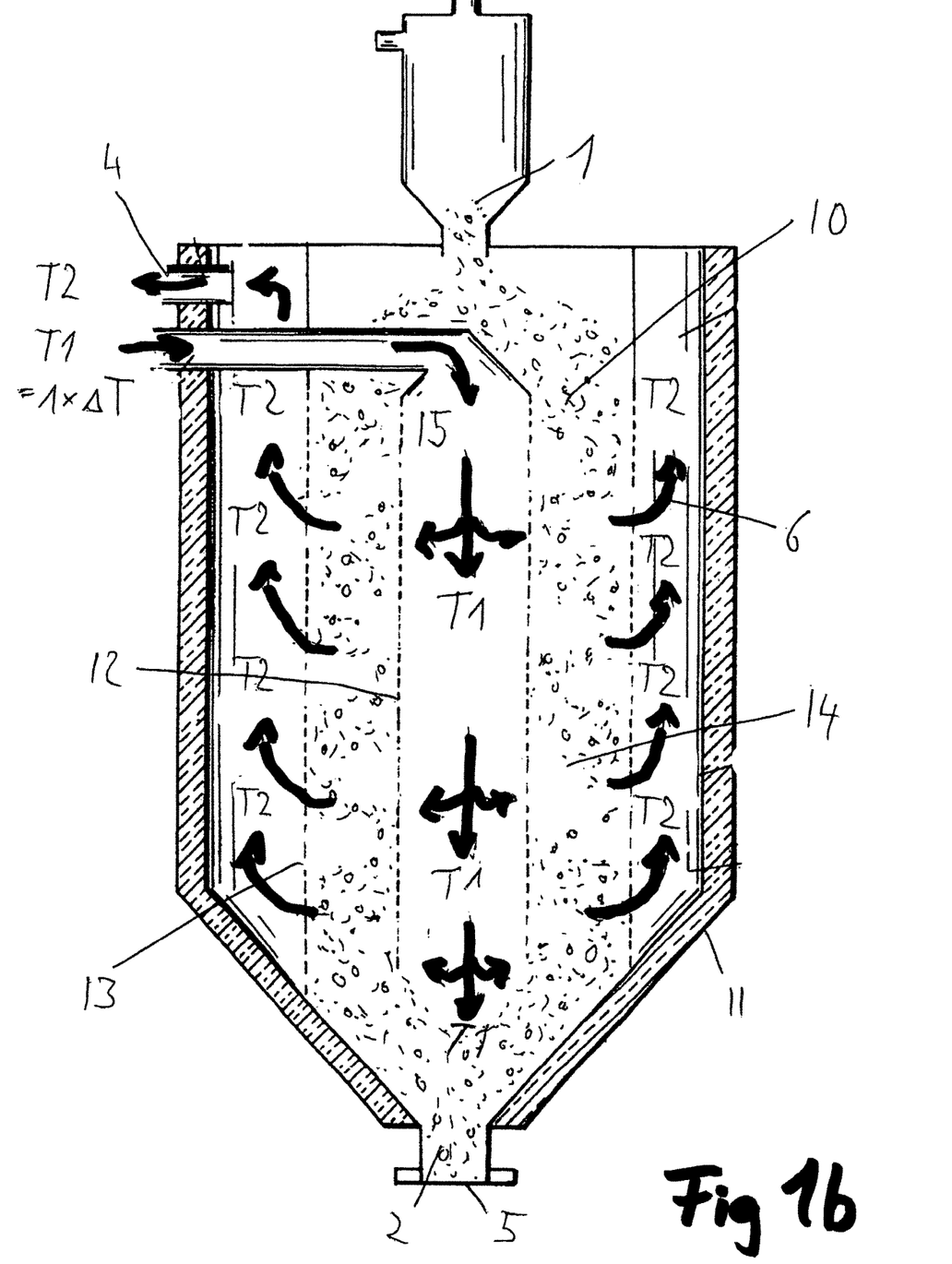
FIG. 1b shows a booster hopper according to DE000019840358A1.

This problem has already been identified in DE000019840358A1. In order to supply the necessary energy requirement to the bulk material, that document describes the process of blowing the hot process air in along the longitudinal axis in the core of the booster hopper by way of a pipe FIG. 1b. The inner pipe, which is perforated over the entire length, then allows this air to pass horizontally through the polymer pellets, without thereby working against its flow direction. An outer pipe, which forms a ring channel for the polymer pellets, is likewise perforated. Here, the air can exit out of the polymer pellets again in order to leave the booster hopper. With this solution, it is possible to significantly increase the flow of the process air, and thus its speed, without the flow direction of the stream of pellets being negatively influenced.

The disadvantage of this solution is that the hot air is supplied to the material in an uncontrolled manner via the hopper axis. This means that the entire material, even that material which has just passed into the booster hopper, is unnecessarily supplied with the same maximally heated air as the material which is just about to pass from the booster into the plastifying means. Experiments have shown that the air even preferably flows through the material in the upper region, since the resistance is lowest there. The material at the outlet should, however, be supplied with the hottest air in order to achieve the maximum energy content in the polymer pellets with the lowest residence time prior to the plastifying operation, and thus to avoid any damage as a result of high temperatures in the case of a relatively long exposure time.

In addition, the ring channel of the process air provides a comparatively short flow path through the polymer pellets, which does not permit an efficient release of heat energy to the bulk material. This means that the air not only releases the heat energy to the bulk material in a completely diffuse and uncontrolled manner but also transports the heat energy into the bulk material in a very inefficient manner owing to the short path through the polymer pellets. The process air thus leaves the booster hopper again with a high temperature level. Temperatures of the outgoing air significantly above 140° C. is too high for normal blowers, and therefore said blowers are damaged. It is necessary to use expensive special blowers, which currently barely exist.

If, now, to assist the plastifying operation, use is made of the possibility of heating the pellets above the usual temperature of 180° C., such as for example to 220° C., then the solution as described in DE000019840358A1 would be unsuitable since the material would be exposed to the high temperatures for too long and the blower would be exposed to a thermal overload.

BRIEF DESCRIPTION OF THE DRAWING

The present invention is explained in more detail below on the basis of exemplary embodiments. In the drawings.

SUMMARY AND DETAILED DESCRIPTION OF THE INVENTION

In the following text, the drawings are intended to assist the explanation of the drying or heating operation of the bulk material directly before the plastifying operation.

In contrast to the method described in the prior art and the corresponding apparatus, the invention describes a solution according to FIG. 2 to FIG. 5, in which the hot and dry process air is blown in through the pipe 3, in a targeted manner, in the region of the bulk material outlet to the plastifying means 2 of the booster hopper 11. Here, too, the bulk material 10 is stored in a ring channel 14, formed from a perforated inner shell 12 and a perforated outer shell 13. The flow direction of the hot and dry process air 6 thus does not run frontally counter to the flow direction of the bulk material 5 and thereby prevent said material from uniformly flowing off to the plastifying means. This has proven to be advisable in DE000019840358A1 described. However, in this invention, the process air is prevented from passing into the upper hopper region by the inner process air barrier 7, it rather being the case that said process air is compelled to penetrate the material in the region of the bulk material outlet 2 with full energy content at maximum temperature shortly before the plastifying operation in order to transfer the optimal quantity of heat with the lowest residence time there.

Figure 2:
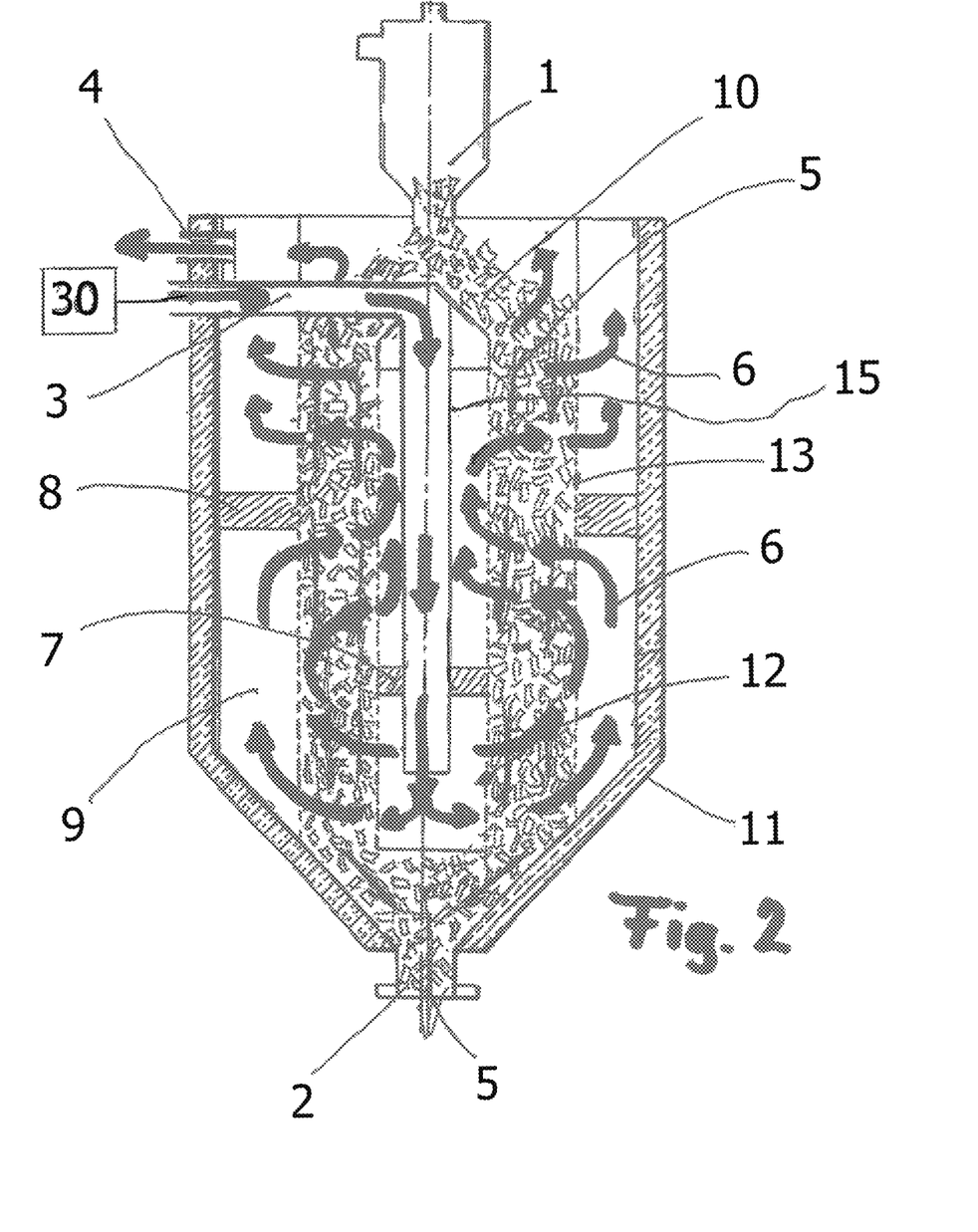
FIG. 2 shows a booster hopper which conducts the process air multiple times through the polymer pellets in cascades.

Thereafter, the process air enters the first outer ring-shaped cascade 9, where the outer process air barrier 8 prevents said process air from escaping from the hopper 11 through the process air outlet 4. Thus, the process air is once again compelled to penetrate the bulk material 10 through the perforated outer shell 13 in order to then again pass into the inner air channel 15, which also forms a cascade, through the perforated inner shell 12.

In this case, the process air by now no longer has the hopper input temperature; said temperature lies at a significantly lower level depending on the release of energy from the first pass through the material. Thus, this temperature is then also already less critical for the material where degradation is concerned. Temperature and residence time have a direct relationship to the degradation—the higher the temperature, the shorter the residence time has to be kept. Nevertheless, during the second pass, there is a sufficient amount of energy to further heat the pellets to be flowed through without bringing said pellets to the most critical, thermal end state.

The inner air channel 15 conducts the air to a higher point in the hopper 11, where said air is compelled for a third time to penetrate the bulk material 10 through the perforated inner shell 12. Since the bulk material 10 in the upper hopper level has hitherto been able to absorb barely any energy as a result of this construction, the process air can likewise efficiently release heat energy here in order to then pass through the perforated outer shell 13 and out of the hopper 11 via the process air outlet 4. From there, the air which has now been cooled in the three stages described here is blown in the closed circuit by means of a blower through a heater 30 that is preferably at a distance of 1 to 50 cm from the plastifying means 2, in order to then pass into the hopper 11 again via the process air inlet 3.

Here, it is described that the process air passes through the bulk material three times, which has proven to be advisable. However, it is possible for penetration to be performed only two times or, where expedient, repeatedly in accordance with the same principle, provided that the ever-increasing counter-pressure and the space conditions are taken into account.

Figure 3:
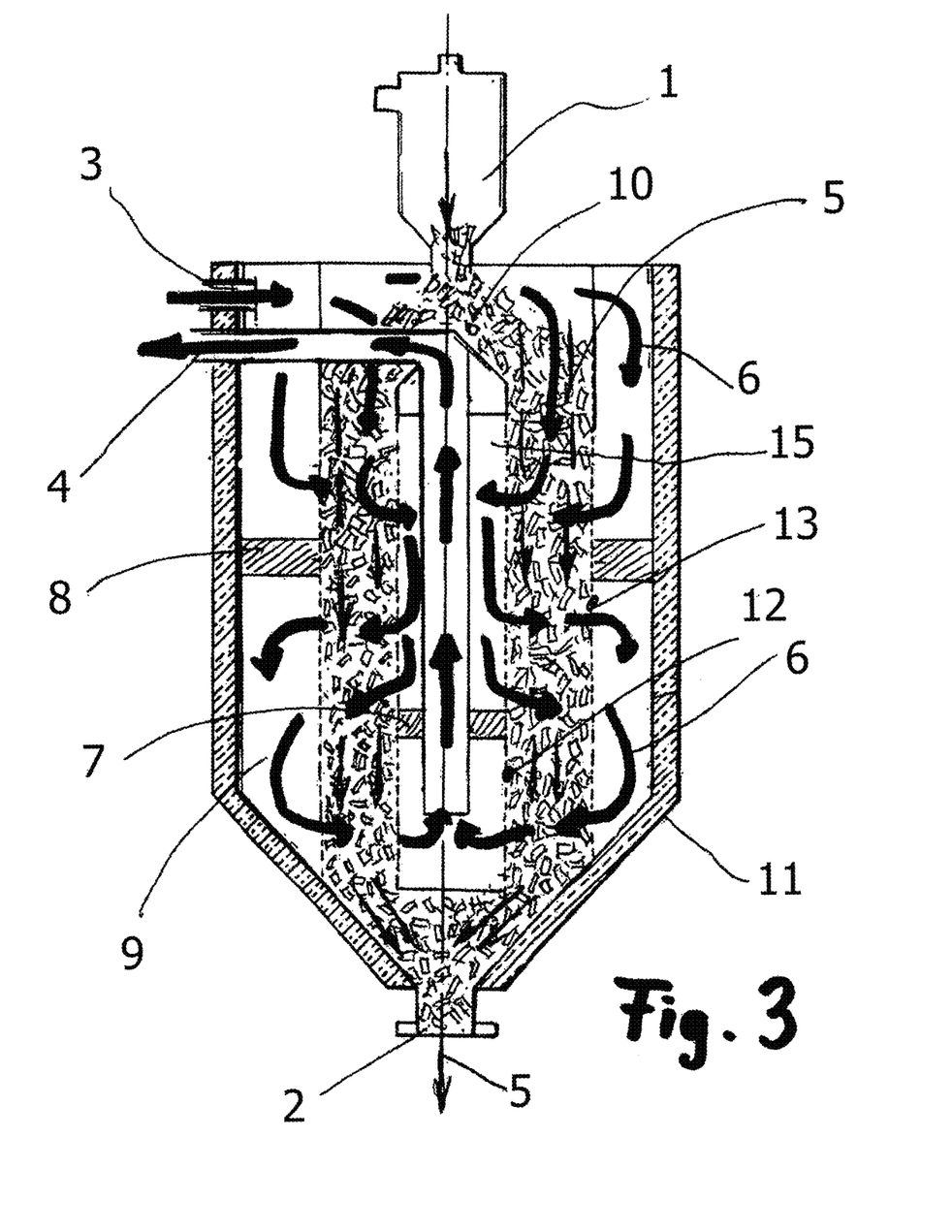
FIG. 3 shows a booster hopper which conducts the process air in the opposite direction multiple times through the polymer pellets in cascades.

It is of course also possible, as shown in FIG. 3, for the process air to be blown in the opposite direction, which may however not have the same efficiency for the demands of the subsequent plastifying operation.

In exceptional cases, depending on the type of bulk material, it may make sense for the process air to be conducted from the top to the bottom through the bulk material in the booster hopper.

In general, the cascades 9 can also be designed with different lengths, in order to influence the speed of the process air. (Example FIG. 4 and FIG. 5) Length A is not equal to length B is not equal to length C. Shortly before the pellets outlet 2 into the plastifying means, it may thus be expedient for the process air to be blown in the hottest state at very high speed through the pellets by keeping the cascade space as short as possible and thus also by keeping the residence time of the pellets at the extremely high temperatures of, for example, 220° C. as short as possible. If the air in the following cascades 9 is then already cooler, the cascade can be of a correspondingly larger (longer) design. This takes account of the physical fact that very hot process air at very high speed can release a large amount of energy to the bulk material in a very short time, and said bulk material is heated through in a few minutes. As a result, a relatively small quantity of material can be efficiently heated shortly before the plastifying process, since the material then has no time left to degrade at the high temperature level. The higher the energy level before the plastifying operation, the more stable and energy-saving the subsequent plastifying process is.

Figure 4:
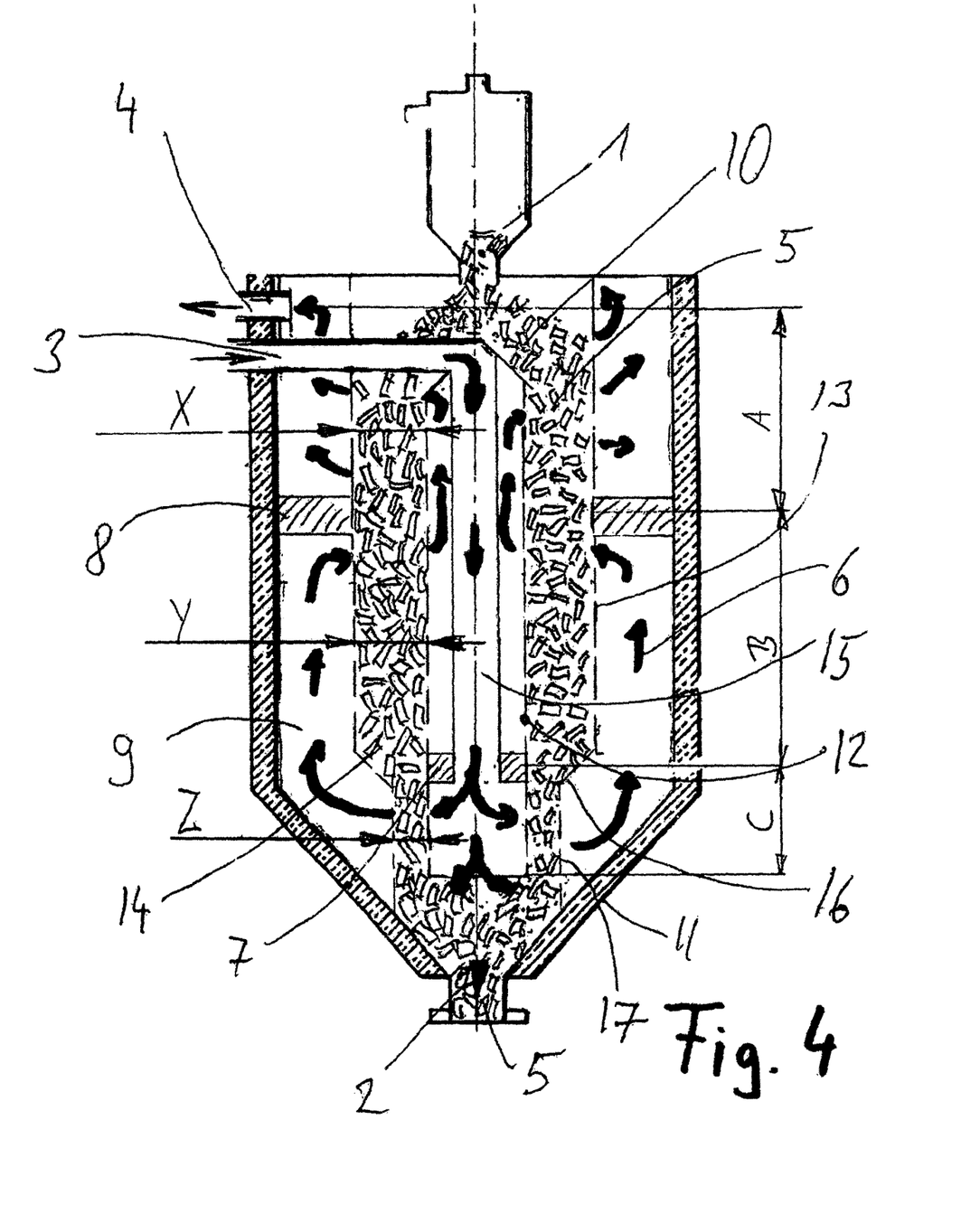
FIG. 4 shows a booster hopper which has cascades of different length, which conducts the process air multiple times through the polymer pellets, wherein the path through the pellets is varied in a stepwise fashion in order to, if necessary, compensate for the resistance.
Figure 5:
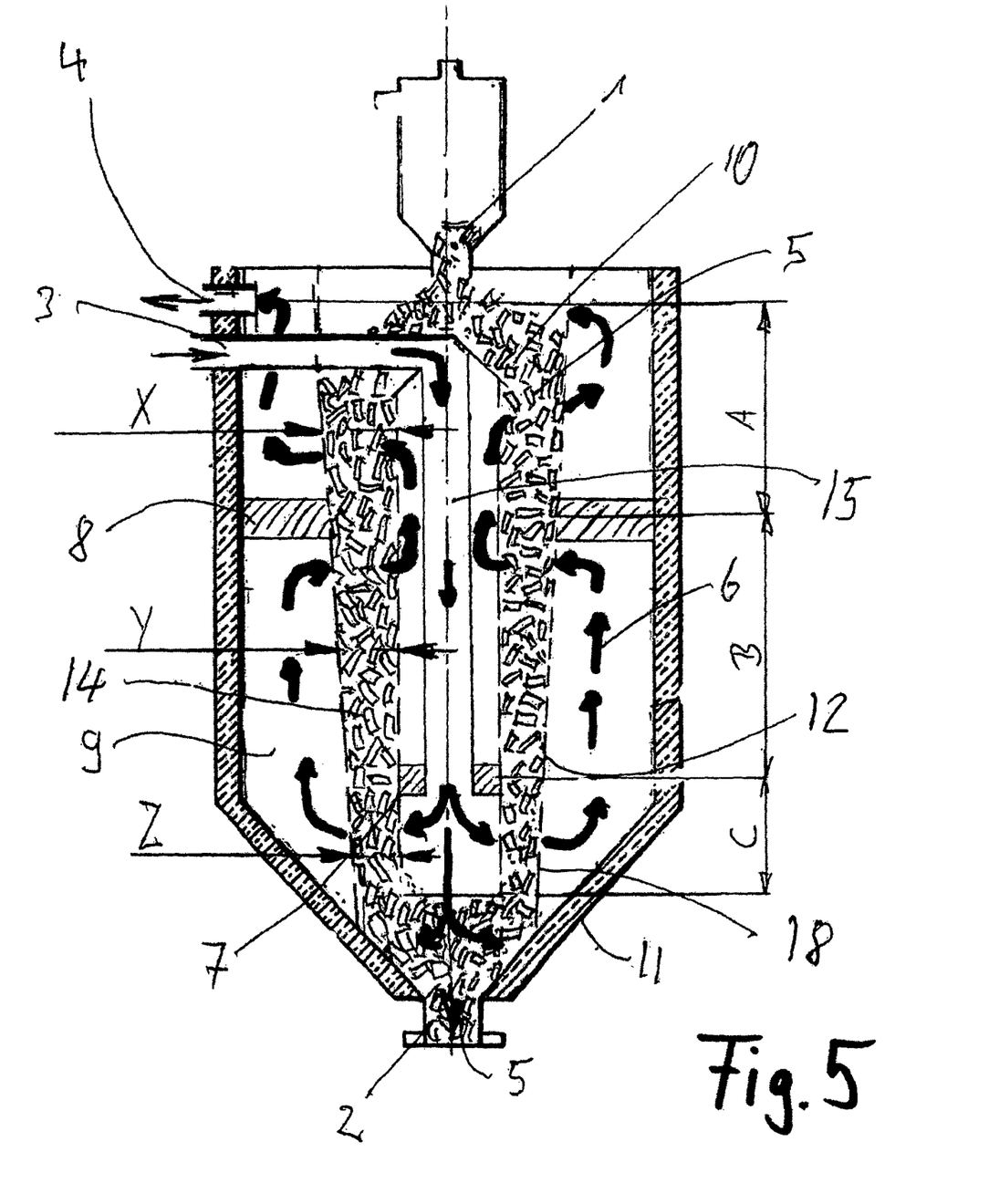
FIG. 5 shows a booster hopper which has cascades of different length, which conducts the process air multiple times through the polymer pellets, wherein the path through the pellets is gradually varied in order to compensate for the resistance.

If only the lengths of the cascades are changed differently, this leads to different resistances for the process air. The smallest cascade would thus determine the total throughput per unit time of the process air. If, for certain reasons, this is too low, it can be compensated with the width of the ring channel X, Y, Z. FIG. 4 and FIG. 5 show the ring channel 14 with various wall thicknesses where X is not equal to Y is not equal to Z. This can be produced in that ideally the perforated outer shell 13 makes a diameter step at the process air barriers 7 and 8, said diameter step preferably being of a conical design in the flow direction. This can of course also be configured with the perforated inner shell 12 or with both shells. One of the perforated shells, or both of them, can also be of a conical design, such that the ring channel 14 becomes gradually smaller. This would also have the advantage that the process air flows into the bulk material 10 at the last moment, preferably directly at the barriers 8.

LIST OF REFERENCE DESIGNATIONS

1 Bulk material conveyance
2 Bulk material outlet to the plastifying means
3 Process air inlet (hot and dry process air)
4 Process air outlet
5 Flow direction of the bulk material
6 Flow direction of the process air
7 Inner process air barrier
8 Outer process air barrier
9 Cascade with ring-shaped process air flow
10 Bulk material
11 Drying or booster hopper
12 Perforated inner shell
13 Perforated outer shell (forms a ring channel with the inner shell)
14 Ring channel for bulk material
15 Inner air channel
16 Conical narrowing of the ring channel
17 Narrower ring channel
18 Tapered perforated outer shell

The invention claimed is:

1. A method for heating and/or drying flowable bulk material, comprising the steps of: conveying the bulk material to a processing unit; and introducing heat energy by introducing a gas to the flow of bulk material so as not to be in direct countercurrent thereto, wherein the gas is introduced in a still hottest state in a targeted manner at a freely selectable location and then flows through the bulk material at least twice by way of cascades and by way of ring channels, wherein resistance of the continuously flowing process gas in each cascade is influenced by the structural design, and thus overall flow and speed of the process gas is influenced, wherein the bulk material is polymer pellets, wherein the processing unit is a plastifier, wherein the bulk material is surrounded by cascade-like flow spaces, wherein the cascades are length-variable, wherein the ring channels are width-variable, and wherein at least one hot air inlet opens into a first of the flow spaces, and thus a temperature level is highest there.

2. The method according to claim 1, wherein the gas is dried air.

3. The method according to claim 1, wherein the freely selectable location is a material outlet of a booster hopper.

4. The method according to claim 1, including conducting the hot gas in a closed circuit.

5. The method according to claim 1, including heating the hot gas before flowing through the bulk material.

6. The method according to claim 1, including repeated flowing of the hot gas through the bulk material so that heat energy is released each time and the gas undergoes corresponding cooling.

7. The method according to claim 1, wherein the heating takes place directly before further processing of the bulk material in the plastifier.

8. An apparatus for heating and drying flowable bulk material, for carrying out the method according to claim 1, comprising: at least one heater; and a plasticizer having at least one flow compartment for the bulk material, said compartment not being in direct countercurrent to a hot air stream, and the hot air stream flows through the bulk material at least twice, for releasing heat energy, by way of cascades, wherein the cascades have individual lengths and have ring channel chambers for influencing flow resistance of the process air so that, as a result of high flow resistance and short residence time, relatively high temperatures are used in a first of the cascades without the bulk material being damaged, wherein the bulk material is polymer pellets, wherein the flow compartment is surrounded by the cascades, wherein the cascades are length-variable, wherein the ring channels are width-variable, and wherein at least one hot air inlet opens into a first of the flow spaces, and thus a temperature level is highest there.

9. The apparatus according to claim 8, wherein the temperature in the first cascade is 220° C.

10. The apparatus according to claim 8, wherein the flow compartment is bounded by at least one wall that has at least one passage opening for the hot air.

11. The apparatus according to claim 8, wherein the flow compartment is bounded by two axial pipes, at least one of the axial pipes has at least one passage opening for the hot air.

12. The apparatus according to claim 11, wherein both of the axial pipes have at least one passage opening for the hot air.

13. The apparatus according to claim 12, wherein the axial pipes are perforated pipes and form a ring channel.

14. The apparatus according to claim 13, wherein the flow compartment is surrounded by cascade-like flow spaces so that the process air flows through the bulk material in the flow compartment at least twice, and the first cascade has a higher temperature level than a following cascade.

15. The apparatus according to claim 14, wherein an outer of the flow spaces is a ring space that lies coaxially with respect to the flow compartment and which has at least one barrier for the air flow in an axial direction.

16. The apparatus according to claim 14, wherein the flow spaces arranged in cascades are ring spaces that lie coaxially with respect to the flow compartment and are configured to be variable in terms of size in order to influence process air speed and flow resistance of the process air.

17. The apparatus according to claim 15, wherein the outer of the flow spaces are surrounded by a shell.

18. The apparatus according to claim 14, wherein a last of the flow spaces is provided with at least one hot air outlet, and thus a temperature level is lowest there.

19. The apparatus according to claim 8, wherein at least one supply line for the hot air opens into an inner pipe.

20. The apparatus according to claim 8, wherein the heater is internal or external to the heating apparatus.

21. The apparatus according to claim 20, wherein the heater is at a distance of 1 to 50 cm from the plastifier.

* * * * *